US008715040B2

(12) United States Patent
Gao

(10) Patent No.: US 8,715,040 B2
(45) Date of Patent: May 6, 2014

(54) WORKHOLDER

(75) Inventor: Dong-Wei Gao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 579 days.

(21) Appl. No.: 12/915,243

(22) Filed: Oct. 29, 2010

(65) Prior Publication Data

US 2011/0151754 A1 Jun. 23, 2011

(30) Foreign Application Priority Data

Dec. 21, 2009 (CN) .......................... 2009 1 0311939

(51) Int. Cl.
*B24B 41/06* (2012.01)

(52) U.S. Cl.
USPC .............................. 451/405; 451/387; 901/30

(58) Field of Classification Search
USPC ..................... 451/331, 405, 364, 387; 901/30
See application file for complete search history.

(56) References Cited

U.S. PATENT DOCUMENTS 5,299,389 A * 4/1994 Yonaha et al. .................... 451/5
5,509,848 A 4/1996 Shimbara
5,738,568 A * 4/1998 Jurjevic et al. .................. 451/41
7,118,452 B2 * 10/2006 Wood .............................. 451/11
8,061,244 B2 * 11/2011 Cooper ............................ 83/13
2004/0102136 A1 5/2004 Wood et al.

FOREIGN PATENT DOCUMENTS

CN 2181365 Y 11/1994

* cited by examiner

*Primary Examiner* — Timothy V Eley
(74) *Attorney, Agent, or Firm* — Novak Druce Connolly Bove + Quigg LLP

(57) ABSTRACT

A workholder includes a connecting member, a polishing member mounted on the connecting member, an elastic member sleeved on the connecting member, and a fixing assembly for movably receiving the connecting member. An end of the elastic member resists the polishing member, and the other end of the elastic member resists the fixing assembly, such that the connecting member is moveable to adjust a position of the polishing member when polishing.

14 Claims, 5 Drawing Sheets

200
IV 21 III
III IV
22 23
25

WORKHOLDER

BACKGROUND

1. Technical Field

The present disclosure relates generally to workholders, particularly, to an adjustable workholder.

2. Description of Related Art

A commonly used polishing mechanism used on a robot arm generally includes a polishing member securely fixed at an end of the robot arm. When a workpiece to be polished has a curved surface, the robot arm must conform to the surface. However, if the contours of the curved surface are complex, the polishing device cannot polish all areas of the workpiece because of the positioning limitations of the robot arm.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
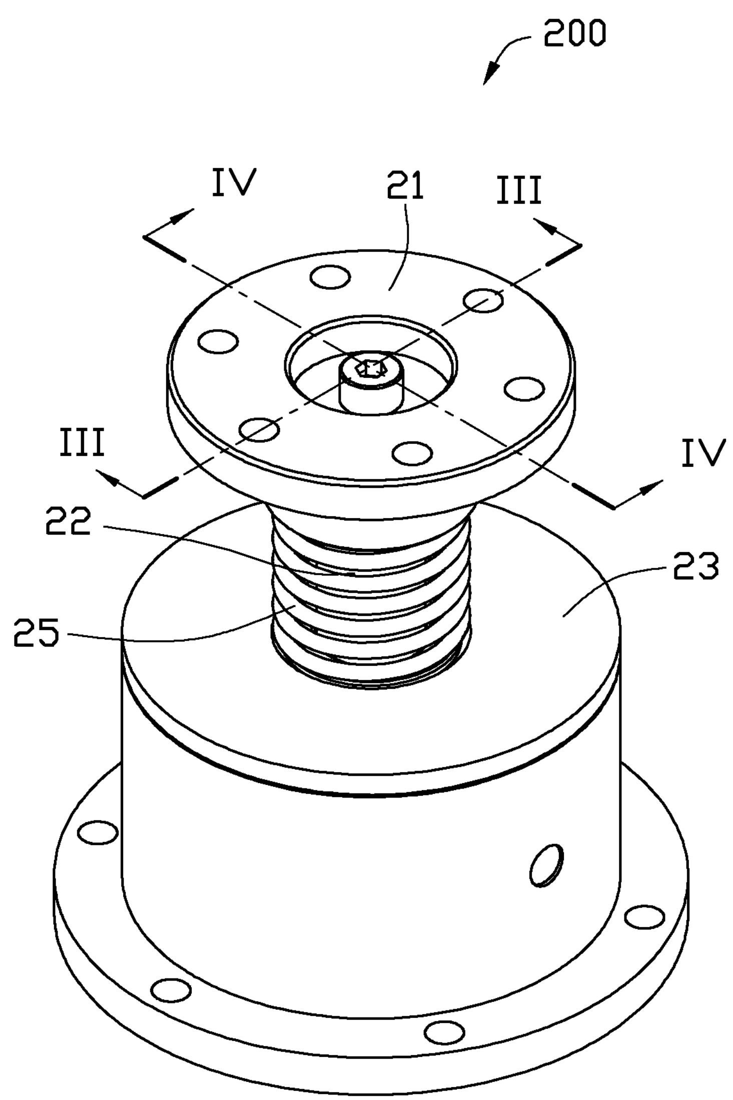
FIG. 1 is an isometric view of an embodiment of a polishing adjustment mechanism of a workholder as disclosed.
Figure 2:
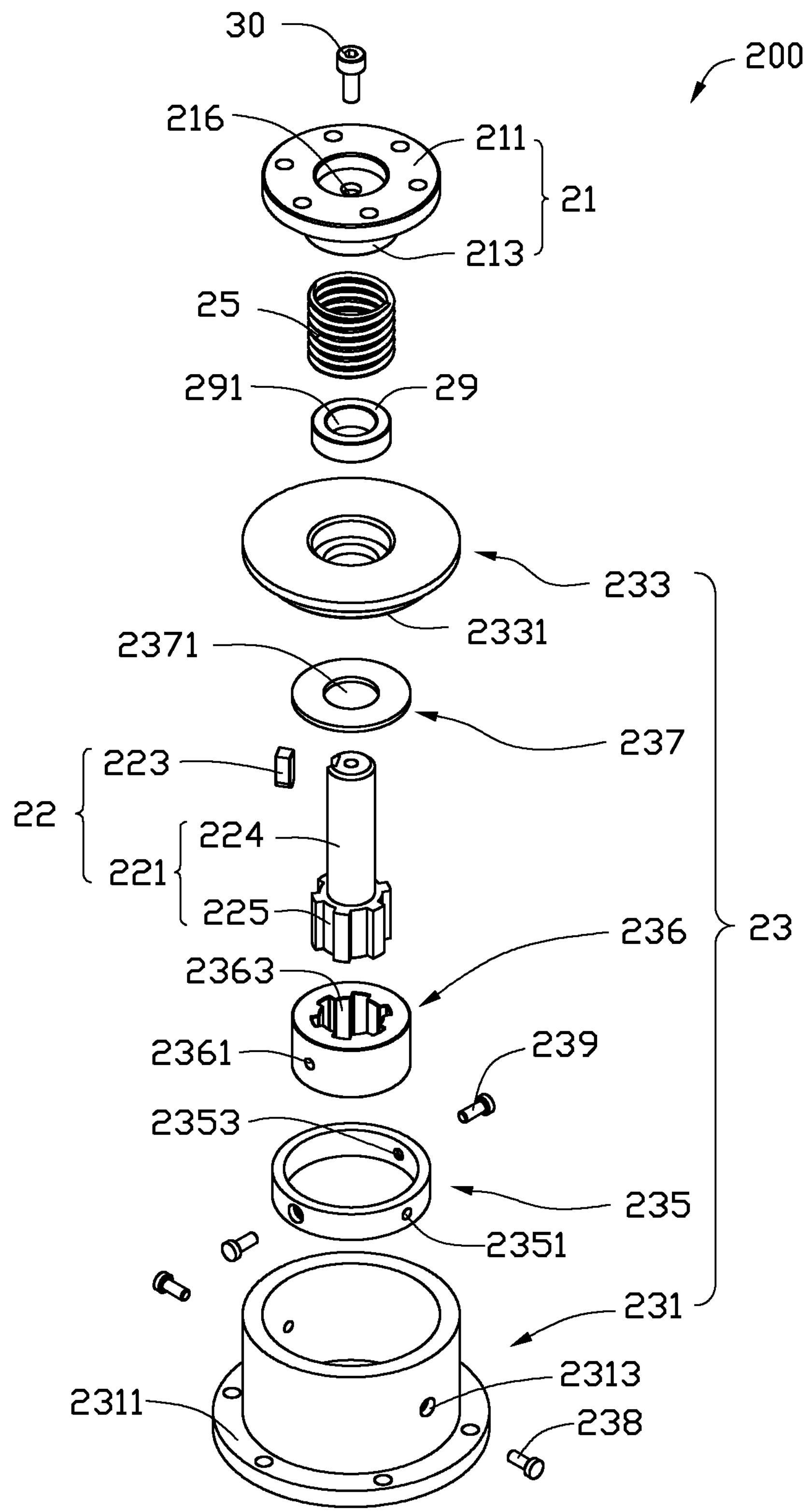
FIG. 2 is an exploded, isometric view of the workholder of FIG. 1.
Figure 3:
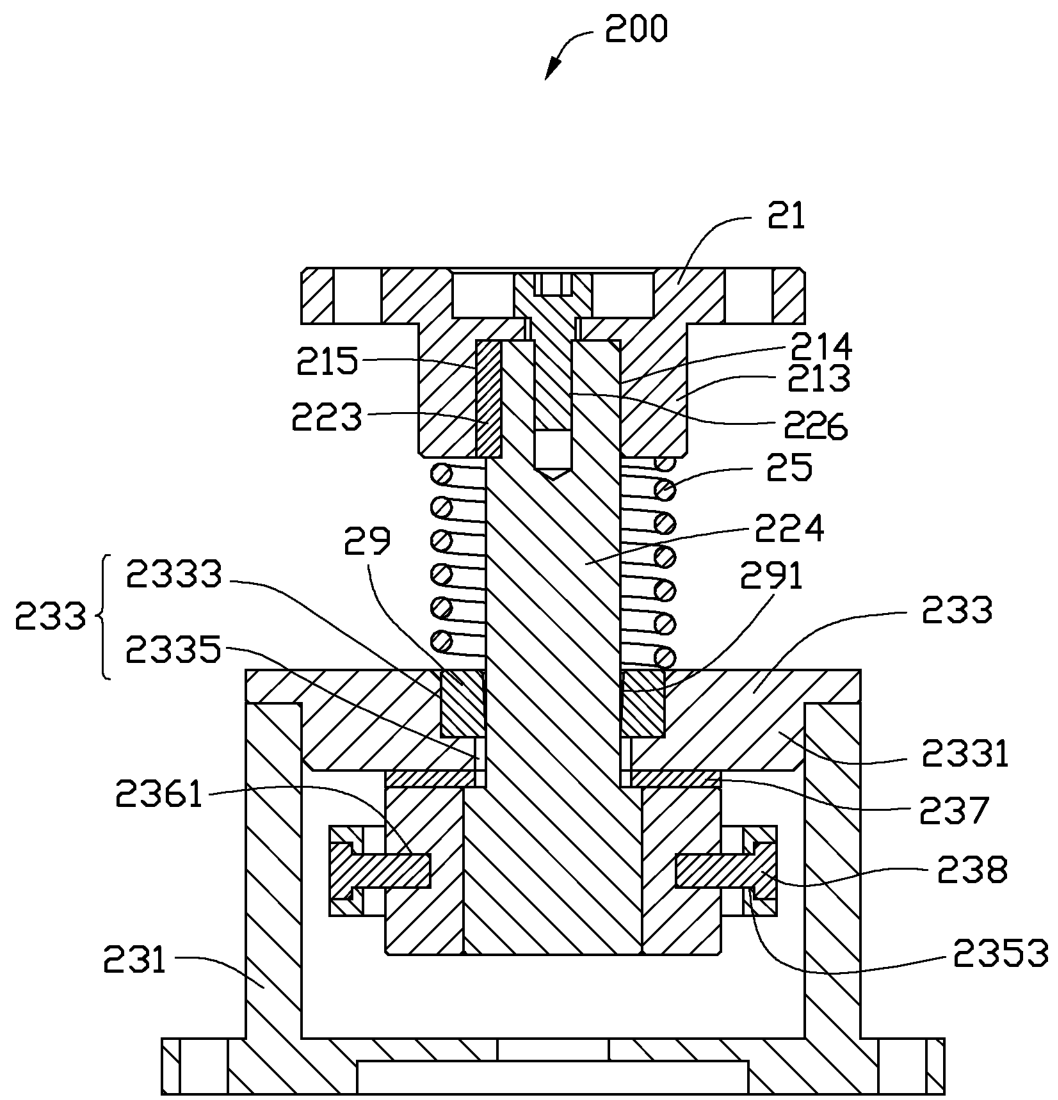
FIG. 3 is cross-section of the workholder shown in FIG. 1, taken along line III-III.
Figure 4:
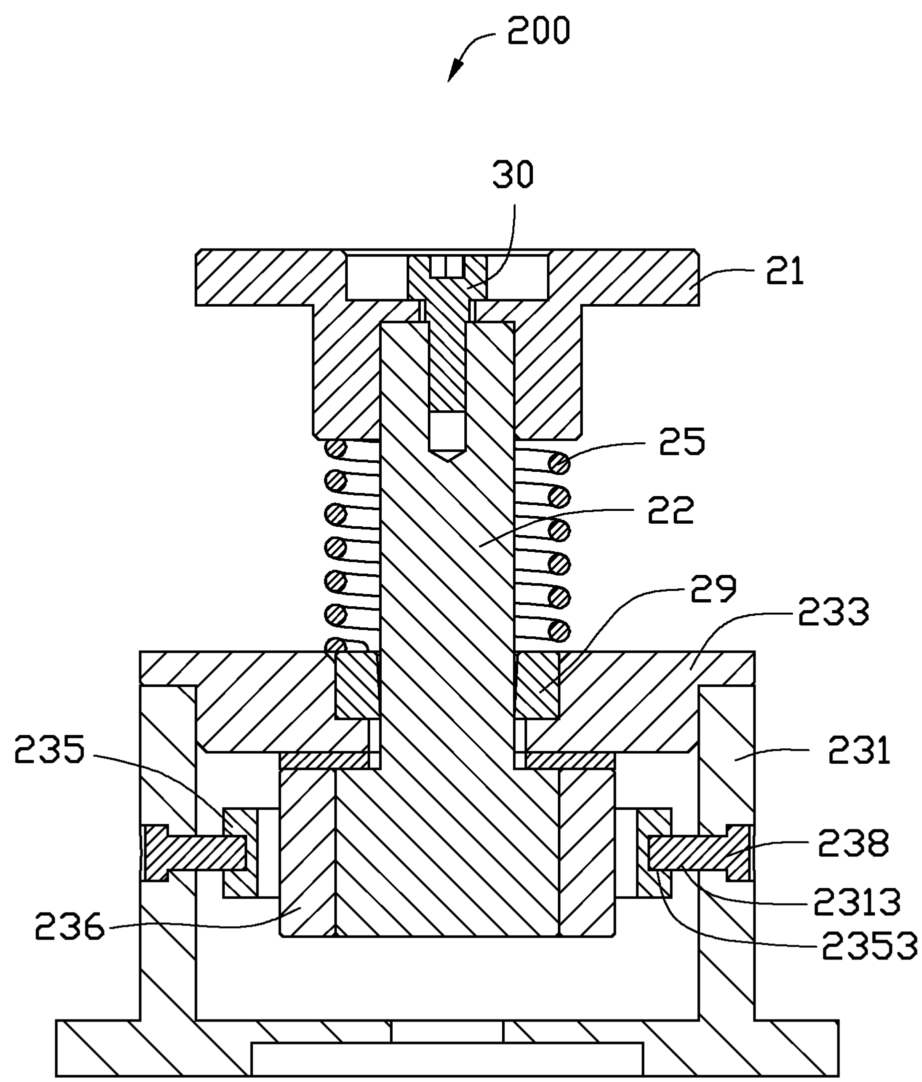
FIG. 4 is cross-section of the workholder shown in FIG. 1, taken along line IV-IV.

Referring to FIGS. 1 through 4, an embodiment of a workholder 200 includes a polishing member 21, a fixing assembly 23 for fixing the polishing member 21, an elastic member 25, and an adjusting sleeve 29.

The polishing member 21 includes a circular main body 211 and a circular contacting portion 213 formed at a surface of the main body 211. The contacting portion 213 defines a receiving groove 214 at a center thereof. The receiving groove 214 defines a stopping slot 215 at a side surface and a pin hole 216 at a bottom surface thereof.

The connecting member 22 includes a spline shaft 221 and a stopping block 223. The spline shaft 221 includes a rod 224 and a spline 225 at an end of the rod 224. The rod 224 defines a pin hole 226 corresponding to the pin hole 216 of the polishing member 21 at an end away from the spline 225. The rod defines a slot 227 at an outer surface thereof adjacent to the end adjacent to the pin hole 226. A depth of the slot 227 is less than a height of the stopping block 223. When the stopping block 223 is received in the slot 227, the stopping block 223 partially extends out of the slot 227.

The fixing assembly 23 includes a barrel 231, a cover 233, a first rotary member 235, a second rotary member 236, a washer 237, a pair of first rotary pins 238, and a pair of second rotary pins 239.

The barrel 231 defines an opening (not labeled) at an end and forms a bottom wall 2311 at the other end. The barrel defines a pair of first positioning holes 2313 opposite to each other. The first positioning holes 2313 are stepped holes for fixing the first rotary pin 238.

The cover 233 forms a fixing portion 2331 at a surface thereof. A diameter of the fixing portion 2331 exceeds that of the barrel 231, thus the fixing portion 2331 may be fixed in the opening of the barrel 231 by interference fit. The cover 233 defines a stepped fixing hole 2332. The fixing hole 2332 includes a receiving portion 2333 away from the fixing portion 2331 and a connecting portion 2335 communicating with the receiving portion 2333 and receiving the adjusting sleeve 29.

The first rotary member 235 is substantially circular. An outer diameter of the rotary member 235 is less than that of the barrel 231. The first rotary member 235 defines a pair of first rotary slots 2351 opposite to each other and a pair of second positioning holes 2353 opposite to each other. The two rotary slots 2351 and the two positioning holes 2353 are spaced on a circumference of the first rotary member 235. A diameter of the first rotary slot 2351 is slightly less than that of the first rotary pin 238. The second positioning hole 2353 is a stepped hole for fixing the second rotary pin 239.

The second rotary member 236 defines a pair of second rotary slots 2361 larger than the second rotary pin 239. The second rotary member 236 defines a spline slot 2363 for receiving the spline 225 of the spline shaft 221.

The washer 237 defines a through hole 2371 at a center thereof. The adjusting sleeve 29 is an elastic tapered sleeve. The adjusting sleeve 29 defines a conical adjusting hole 291 therein. The adjusting sleeve 29 has a tapered angle in a range from about 3° to about 5°. In the illustrated embodiment, the washer 237 and the adjusting sleeve 29 are made of rubber.

In assembly, the second rotary member 236 is positioned in the first rotary member 235. An end of the second rotary pin 239 is fixed in the first positioning hole 2313 by interference fit, the other end of the second rotary pin 239 passes through the first rotary slot 2351, thus to rotatably fix the second rotary member 236 in the first rotary member 235. The first rotary member 235 is then positioned in the barrel 231, and an end of the first rotary pin 238 is fixed in the first positioning hole 2313 by interference fit. The other end of the first rotary pin 238 is received in the first rotary slot 235 to rotatably fix the first rotary member 235 in the barrel 231. The spline 225 of the spline shaft 221 is received in the spline slot 2363 of the second rotary member 236, to immovably mount the spline shaft 221 on the second rotary member 236. That is, the spline shaft 221 is slidable along its axis and rotatable around an axis of the first rotary pin 238 or an axis of the second rotary pin 239, to adjust the position of the spline shaft 221. An outer diameter of the spline 225 exceeds that of the communicating portion 2335 of the fixing hole and the through hole 2371 of the washer 237, to prevent the spline 225 from detaching from the barrel 231. The adjusting sleeve 29 is glued in the receiving portion 2333 of the cover 233. The rod 224 of the spline shaft 221 passes through the through hole 2371 of the washer 237, the adjusting sleeve 29 and the elastic member 25 in that order, then the cover 233 is fixed in the opening of the barrel 231 by interference fit, such that the rod 224 of the spline shaft 221 can pass through the fixing hole 2332 of the cover 233 and protrude out of the barrel 231. The stopping block 223 is positioned in the slot 227 of the rod 224. The rod 224 is then received into the receiving groove 214. The fixing pin 30 is passed through the pin hole 216 and received in the pin hole 226 of the connecting member 22 to fix the polishing member 21 on the connecting member 22, such that the polishing member 21 is moveable following the connecting member 22. The slot 227 of the rod 224 and the receiving slot 214 of the cover cooperatively receive the stopping block 223 to prevent slipping between the connecting member 22 and the polishing member 21. An end of the elastic member 25 resists the cover 233, and the other end of the elastic member 25 resists the contacting portion 213 of the polishing member 21. Thus, the polishing member 21 can slide axially and compress the elastic member 25. The rod 224 is moveable relative to the barrel 231, compressing the adjusting sleeve 29, to adjust a position angle of the polishing member 21 relative to the barrel 231.

Figure 5:
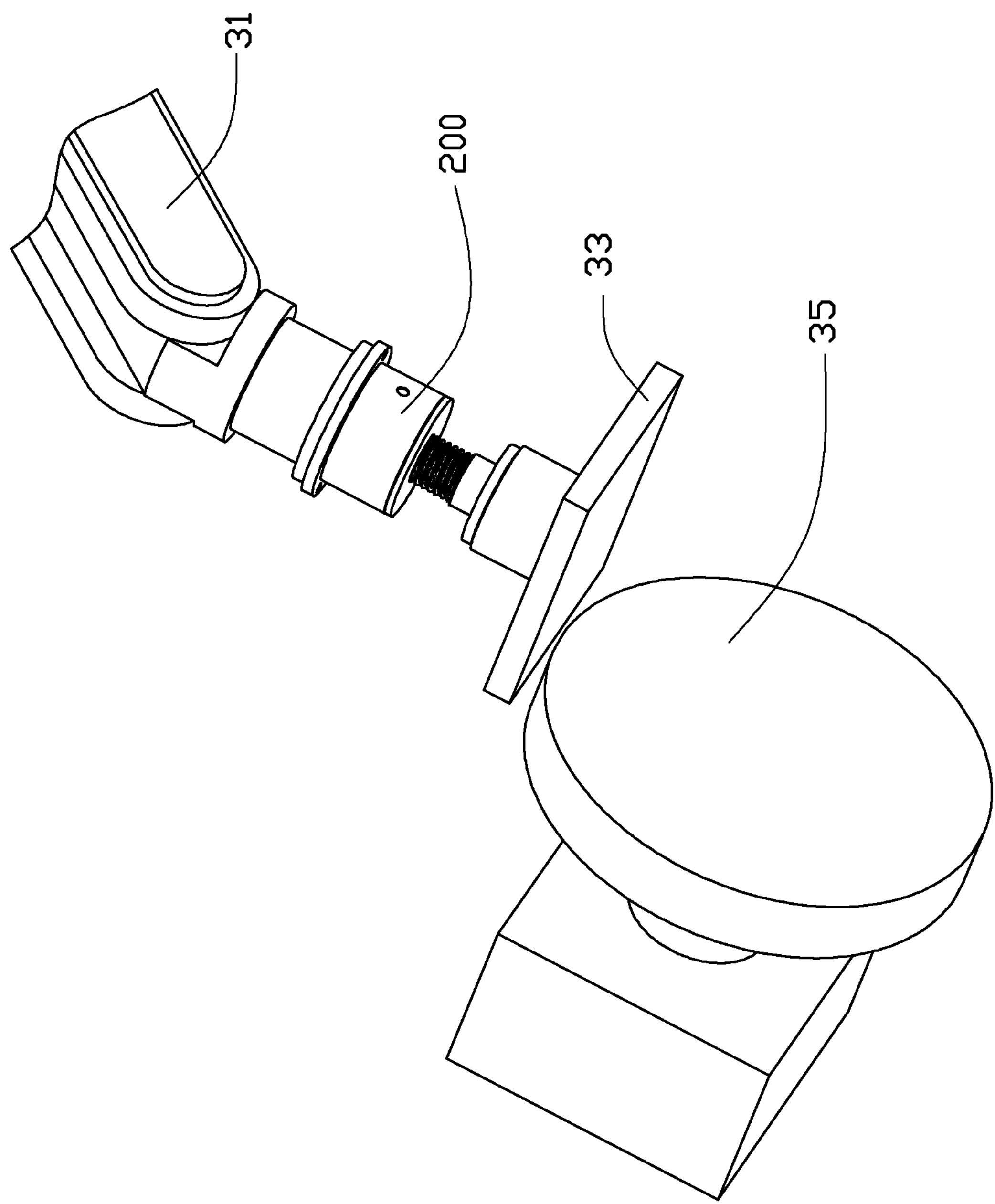
FIG. 5 is an isometric view of the workholder mounted on a robot arm.

Referring to FIG. 5, in use, the barrel 231 of the workholder 200 is mounted on an end of a robot arm (not labeled). A workpiece 33 to be polished is fixed on the polishing member 21. The robot arm moves the workpiece 33 on a polishing wheel 35. If protrusions on the workpiece 33 seize the polishing member 21, the polishing member 21 may compress the elastic member 25 to overcome the seizure. After the polishing member 21 overcomes seizure, the elastic member 25 resists the polishing member 21 to contact portions of the workpiece 33 behind the protrusions and improve the polishing quality. If a surface to be polished is curved, the robot arm may move the polishing member 21 accordingly for polishing, and the rod 224 of the spline shaft 221 may be adjusted during polishing to polish all the areas of the workpiece, even when there are minor positioning errors of the robot arm.

It is noted that the fixing assembly 23 may be a spherical hinge mounted in the barrel 231, thus the polishing member 21 can rotate freely.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A workholder, comprising:

a connecting member;

a polishing member mounted on the connecting member;

an elastic member sleeved on the connecting member; and a fixing assembly for movably receiving the connecting member, wherein the elastic member is resisted between the polishing member and the fixing assembly, such that the connecting member is movable to adjust a position of the polishing member when polishing.

2. The workholder of claim 1, wherein the fixing assembly comprises a barrel and a first rotary member movably received in the barrel.

3. The workholder of claim 2, wherein the connecting member comprises a spline shaft, the spline shaft comprises a spline formed at an end, the fixing assembly further comprises a second rotary member rotatably received in the barrel, and the second rotary member defines a spline slot for receiving the spline.

4. The workholder of claim 1, wherein the connecting member comprises a spline shaft and a stopping block, the spline shaft comprises a rod and a spline at an end of the rod, the polishing member defines a receiving groove for receiving an end of the spline shaft away from the spline thereof, the rod defines a slot, the receiving groove defines a stopping slot at a side surface corresponding to the slot, and the slot and the stopping slot cooperatively receive the stopping block.

5. The workholder of claim 4, wherein the fixing assembly further comprises a first rotary pin, the barrel defines a first positioning hole for positioning the first rotary pin, the first rotary member defines a first rotary slot corresponding to the first positioning hole, an end of the first rotary pin is received in the first positioning hole, and another end of the first rotary pin is received in the first rotary slot, rotatably mounting the first rotary member in the barrel.

6. The workholder of claim 5, wherein the fixing assembly further comprises a second rotary pin, the first rotary member defines a second positioning hole, the second rotary member defines a second rotary slot, an end of the second rotary pin is received in the second positioning hole, and another end of the second rotary pin is received in the second rotary slot, rotatably mounting the second rotary member in the first rotary member.

7. The workholder of claim 6, wherein the fixing assembly further comprises a cover on the barrel and a washer between the second rotary member and the cover, wherein the cover defines a fixing hole through which the rod passes.

8. A workholder, comprising:

a connecting member;

a polishing member mounted on the connecting member;

an elastic member sleeved on the connecting member;

an adjusting sleeve; and a fixing assembly for movably receiving the connecting member, wherein the fixing assembly comprises a cover, the cover defines a fixing hole for receiving the adjusting sleeve, the connecting member passes through the adjusting sleeve, the elastic member is resisted between the polishing member and the cover, such that the connecting member is movable to adjust a position of the polishing member.

9. The workholder of claim 8, wherein the fixing assembly comprises a barrel and a first rotary member movably received in the barrel.

10. The workholder of claim 9, wherein the connecting member comprises a spline shaft, the spline shaft comprises a spline formed at an end, the fixing assembly further comprises a second rotary member rotatably received in the barrel, and the second rotary member defines a spline slot for receiving the spline.

11. The workholder of claim 8, wherein the connecting member comprises a spline shaft and a stopping block, the spline shaft comprises a rod and a spline at an end of the rod, the polishing member defines a receiving groove for receiving an end of the spline shaft away from the spline thereof, the rod defines a slot, the receiving groove defines a stopping slot at a side surface corresponding to the slot, and the slot and the stopping slot cooperatively receive the stopping block.

12. The workholder of claim 11, wherein the fixing assembly further comprises a first rotary pin, the barrel defines a first positioning hole for positioning the first rotary pin, the first rotary member defines a first rotary slot corresponding to the first positioning hole, an end of the first rotary pin is received in the first positioning hole, and another end of the first rotary pin is received in the first rotary slot, rotatably mounting the first rotary member in the barrel.

13. The workholder of claim 12, wherein the fixing assembly further comprises a second rotary pin, the first rotary member defines a second positioning hole, the second rotary member defines a second rotary slot, an end of the second rotary pin is received in the second positioning hole, another end of the second rotary pin is received in the second rotary slot, rotatably mounting the second rotary member in the first rotary member.

14. The workholder of claim 13, wherein the second rotary member is rotatably received in the barrel, the cover seals the barrel, the fixing assembly further comprises a washer between the second rotary member and the cover, the rod passes through the fixing hole of the cover and the washer, and is partially received within the barrel, the spline is received in the second rotary member.

* * * * *